United States Patent
El-Zehiry et al.

(10) Patent No.: US 9,547,906 B2
(45) Date of Patent: Jan. 17, 2017

(54) SYSTEM AND METHOD FOR DATA DRIVEN EDITING OF RIB UNFOLDING

(71) Applicant: Siemens Healthcare GmbH, Erlangen (DE)

(72) Inventors: Noha Youssry El-Zehiry, Plainsboro, NJ (US); Grzegorz Soza, Heroldsberg (DE); Andreas Wimmer, Forchheim (DE); Shaohua Kevin Zhou, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 79 days.

(21) Appl. No.: 14/489,853

(22) Filed: Sep. 18, 2014

(65) Prior Publication Data

US 2015/0078645 A1 Mar. 19, 2015

Related U.S. Application Data

(60) Provisional application No. 61/879,778, filed on Sep. 19, 2013.

(51) Int. Cl.
*G06K 9/00* (2006.01)
*G06T 7/00* (2006.01)

(52) U.S. Cl.
CPC ........... *G06T 7/0081* (2013.01); *G06T 7/0085* (2013.01); *G06T 2207/10072* (2013.01); *G06T 2207/10076* (2013.01); *G06T 2207/30008* (2013.01); *G06T 2207/30172* (2013.01)

(58) Field of Classification Search
CPC ................ G06T 7/0081; G06T 7/0085; G06T 2207/30172; G06T 2207/10072; G06T 2207/30008; G06T 2207/10076

USPC .................................................. 382/128–134
See application file for complete search history.

(56) References Cited

U.S. PATENT DOCUMENTS

| | | |
|---|---|---|
| 6,345,113 B1 | 2/2002 | Crawford |
| 6,594,378 B1 | 7/2003 | Li et al. |
| 7,369,693 B2 | 5/2008 | Shen |
| 7,764,816 B2 | 7/2010 | Shen et al. |
| 8,150,135 B2 | 4/2012 | Acharyya et al. |
| 8,165,376 B2 | 4/2012 | Shen et al. |
| 2006/0173271 A1 | 8/2006 | Shen et al. |
| 2006/0173272 A1 | 8/2006 | Qing et al. |
| 2006/0228015 A1 | 10/2006 | Brockway et al. |

(Continued)

OTHER PUBLICATIONS

Shen, Hong, et al. "Tracing based segmentation for the labeling of individual rib structures in chest CT volume data." Medical Image Computing and Computer-Assisted Intervention-MICCAI 2004. Springer Berlin Heidelberg, 2004. 967-974.*

(Continued)

*Primary Examiner* — Andrew Moyer

(57) ABSTRACT

A method and apparatus for data driven editing of rib centerlines is disclosed. A user input location indicating an inaccuracy in a rib centerline extracted from a medical image volume is received. A local correction of the rib centerline is performed. A portion of the rib surrounding a current centerline point to be corrected is segmented based on image data of the medical image volume. A corrected centerline point for the current centerline point is generated based on the segmented portion of the rib. The centerline correction is then extended to subsequent points along the rib centerline.

38 Claims, 6 Drawing Sheets

(56) References Cited

U.S. PATENT DOCUMENTS

| | | | |
|---|---|---|---|
| 2008/0107318 A1 | 5/2008 | Kiraly | |
| 2010/0145231 A1* | 6/2010 | Takahashi | A61B 5/1075 600/587 |
| 2010/0239140 A1 | 9/2010 | Ruijters et al. | |
| 2012/0002855 A1 | 1/2012 | Bai | |
| 2012/0014506 A1 | 1/2012 | Lee et al. | |
| 2013/0070996 A1* | 3/2013 | Liu | G06K 9/00 382/131 |
| 2013/0077841 A1* | 3/2013 | Wu | G06K 9/6207 382/131 |

OTHER PUBLICATIONS

Felkel, et al., "Surface Models of Tube Trees," IEEE, 2004.
Aylward et al, "Initialization, Noise, Singularities, and Scale in Height Ridge Traversal for Tubular Object Centerline Extraction," IEEE TMI, Feb. 2002, pp. 1-27 (61-75).
Kadoury et al, "Personalized X-Ray 3-D reconstruction of the Scoliotic Spine from Hybrid Statistical and Image Based Models," IEEE transactions on medical imaging, vol. 28, No. 9, Sep. 2009, pp. 1422-1435.
Shen et al., "Tracing Based Segmentation for the Labeling of Individual Rib Structures in Chest CT Volume Data," MICCAI 2004, LNCS 3217, pp. 967-974.

\* cited by examiner 200    210    220    230

SYSTEM AND METHOD FOR DATA DRIVEN EDITING OF RIB UNFOLDING

This application claims the benefit of U.S. Provisional Application No. 61/879,778, filed Sep. 19, 2013, the disclosure of which is herein incorporated by reference.

BACKGROUND OF THE INVENTION

The present invention relates to data driven editing of rib centerlines extracted from medical image data, and more particularly, to interactive data driven correction of inaccurate portions of rib centerlines to achieve better accuracy of rib centerline extraction and rib unfolding.

Locating rib metastases and fractures in chest CT scans typically involves reading hundreds of axial CT slices to visually track changes in rib cross-section area. Manual reading of CT scans is rather time consuming and rib anomalies are frequently missed in practice due to human error. Automatic extraction of rib anatomical centerlines can be used to enhance the visualization of an unfolded rib cage. Accordingly, accurate detection of rib centerlines is an important task that aids radiologists in finding metastases and fractures in an efficient manner. However, inaccurate detection can jeopardize the accuracy of a diagnosis, for example by causing the radiologist to miss a rib lesion. Since the automatic rib centerline extraction task cannot consistently provide 100% accuracy, an interactive correction system that allows a radiologist to correct rib centerlines when the automatic extraction does not provide satisfactory results is desirable.

BRIEF SUMMARY OF THE INVENTION

The present invention provides a method and system for data driven editing of rib centerlines extracted from medical image data. Embodiments of the present invention provide an interactive method for correcting inaccuracies in rib centerlines based on input from a user, such as a radiologist. Embodiments of the present invention utilize image information in a neighborhood of the user's input and performs correction of the rib centerline with minimal user interaction by extending the rib centerline correction beyond the user's input.

In one embodiment of the present invention, a user input location indicating an inaccuracy in a rib centerline extracted from a medical image volume is received. A centerline point to be corrected corresponding to the user input location is determined. A portion of the rib surrounding the centerline point is segmented based on image data in the medical image volume. A corrected centerline point is generated for the centerline point based on the segmented portion of the rib.

These and other advantages of the invention will be apparent to those of ordinary skill in the art by reference to the following detailed description and the accompanying drawings.

DETAILED DESCRIPTION

The present invention relates to a method and system for data driven editing of rib centerlines extracted from medical image data. Embodiments of the present invention are described herein to give a visual understanding of the rib centerline editing method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention provide an interactive method to correct inaccuracies on rib centerlines automatically extracted from medical image data based on input from a user, such as a radiologist. Embodiments of the present invention formulate the data driven editing as an energy minimization problem in which a new centerline point is calculated for a given centerline point as the center of mass of the rib cross-section in a plane orthogonal to the rib centerline. A tracing scheme is used to continue the rib centerline editing beyond the location input by the user in order to correct a large portion of the rib centerline with minimal user input. Embodiments of the present invention utilize image data in a neighborhood of the centerline point to formulate the energy minimization problem in order to obtain a more accurate segmentation. Conventional methods depend only on geometric information to correct such thin structures without using the image information. Embodiments of the present invention also utilize a re-initialization component, in which a rib centerline point to be corrected is re-initialized based on the neighboring ribs, to prevent the rib tracing from deviating from the correct solution.

Figure 1:
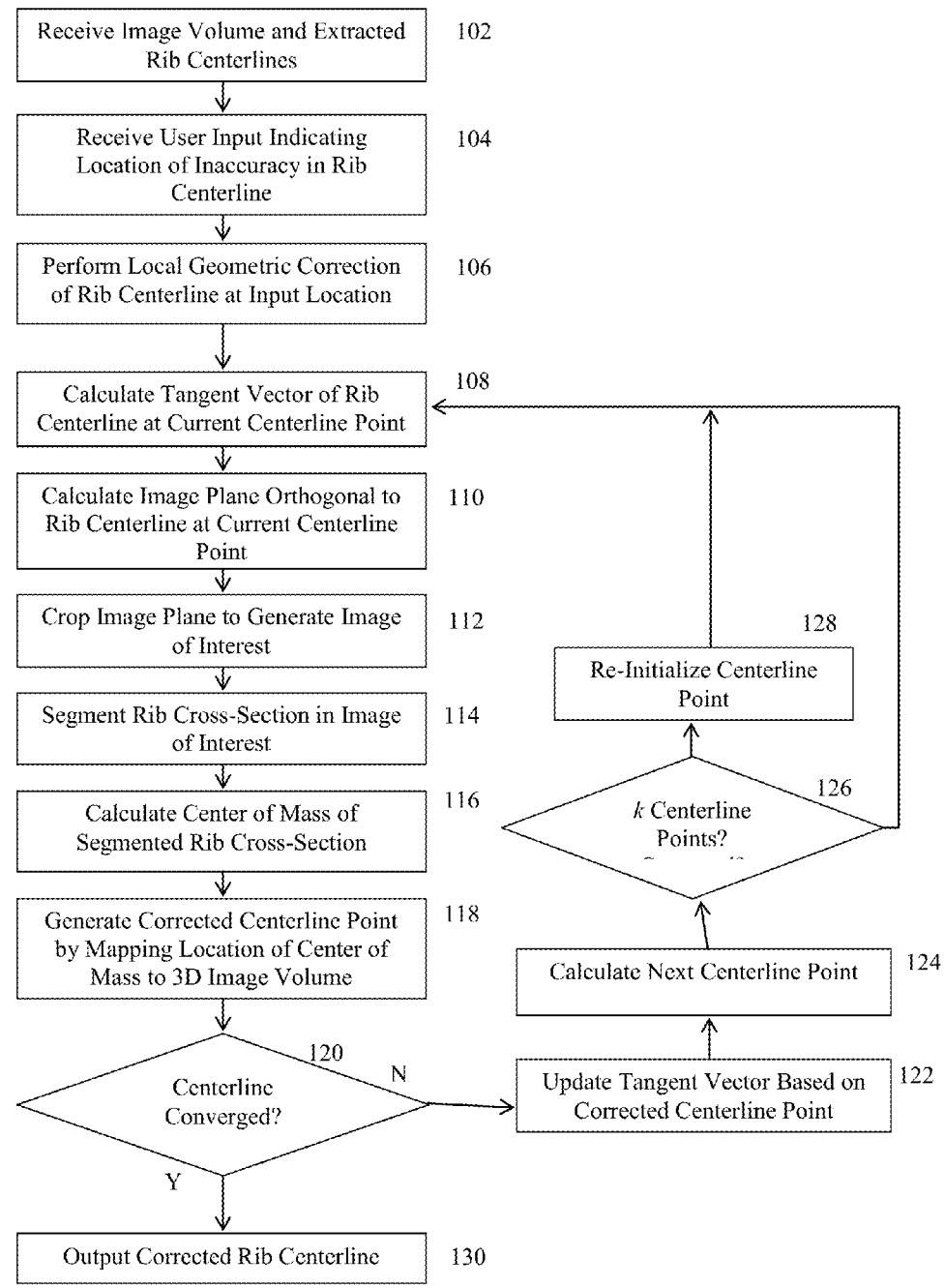
FIG. 1 illustrates a method for data driven editing of a rib centerline according to an embodiment of the present invention.

FIG. 1 illustrates a method for data driven editing of a rib centerline according to an embodiment of the present invention. The method of FIG. 1 transforms medical image data representing a patient's anatomy and rib centerlines extracted from the medical image data to generate corrected rib centerlines that more accurately visualize the patient's ribs. Referring to FIG. 1, at step 102, a medical image volume and rib centerlines extracted from the medical image volume are received. In one embodiment, the medical image volume may be a 3D computed tomography (CT) volume, but the present invention is not limited thereto and the medical image volume can be a 3D volume acquired using any medical imaging modality (e.g., CT, magnetic resonance imaging (MRI), ultrasound, positron emission tomography (PET), etc.). The medical image volume can be received directly from an image acquisition device, such as a CT scanner, or the medical image volume can be received by loading a medical image volume previously stored on a memory or storage of a computer system.

In one embodiment, once the medical image volume is received, the rib centerlines are automatically extracted from the medical image volume. The rib centerlines can be extracted using any automatic or semi-automatic rib centerline extraction method. In a possible implementation, the rib centerline for each rib may be automatically extracted in the 3D CT volume using a learning-based deformable template matching method. In the learning-based deformable template matching method for automatic rib centerline extraction, a probability response map can be obtained from the 3D CT volume using learning-based rib center point detection can be performed with a coarse-to-fine pyramid learning structure. The obtained probability response map is then used to extract the rib centerlines via matching of a whole rib cage template. Each rib centerline can then be refined individually using active contour model refinement. The learning-based deformable template matching method for automatic rib centerline extraction is described in greater detail in U.S. Published Patent Application No. 2013/0077841 and U.S. Published Patent Application No. 2013/0070996, which are incorporated herein by reference in their entirety. It is to be understood that the present invention is not limited to the learning-based deformable template matching method for automatic rib centerline extraction, and can be applied to correct rib centerlines extracted using any rib centerline extraction method. In an alternate embodiment, the extracted rib centerlines are received by loading stored rib centerlines that were previously extracted from the medical image volume.

The extracted rib centerlines are displayed, for example on a display device of a computer system. The extracted rib centerlines can be visualized by performing a rib unfolding method. Rib unfolding refers to the flattening of the rib cage into a 2D image that provides a visualization of all of the ribs. Such a 2D unfolded rib image enables a radiologist to quickly examine all of the ribs without having to scroll through every slice of a CT scan. For example, rib unfolding may be performed using the method described in U.S. Published Patent Application No. 2013/0070996, which is incorporated herein by reference in its entirety. The extracted rib centerlines may also be visualized using 2D images showing cross sections of the ribs. The extracted rib centerlines may also be visualized using a 3D visualization.

At step 104, a user input indicating a location of an inaccuracy in a rib centerline is received. The extracted rib centerlines are displayed on a display device, and the user can select or "click" on a location p indicating an inaccuracy in the displayed rib centerlines. For example, the user can select the location p in a 2D unfolded rib image or in a visualization of a rib cross section. The user can input the location p indicating an inaccuracy in a rib centerline using an input device, such as mouse, touchpad, touch screen, etc. The location p can correspond to an approximate correct location corresponding to the inaccuracy in the rib centerline. For example, while viewing rib cross-section images, the user may stop at a cross-section with an inaccuracy and click at the location of the correct centerline point in this cross-section, or the user may pull the incorrect centerline point to the correct location in a hold mouse—pull interaction.

At step 106, a local geometric correction of the rib centerline is performed at the location input by the user. This provides a quick initial centerline correction in the vicinity of the input location such that a tangent vector of the centerline can be accurately calculated. In an advantageous implementation, cubic spline interpolation is applied to perform a geometric correction of the centerline in the vicinity of the user input location. The cubic spline interpolation generates a geometrically edited centerline $C_G$ including the centerline points $\{c_1, c_2, \ldots, c_n\}$.

At step 108, a tangent vector of the rib centerline at the current centerline point is calculated. The unit vector in the direction of the tangent of the centerline is calculated as $$\frac{c_{p+1} - c_p}{\|c_{p+1} - c_p\|},$$

where $c_p$ is the current centerline point. For the initial centerline point, the current centerline point $c_p$ is the closest geometrically edited centerline point to the user input location p.

Figure 2:
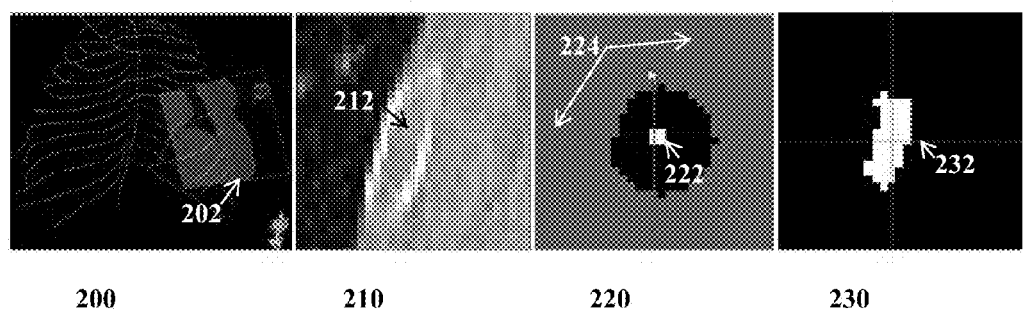
FIG. 2 illustrates exemplary results of various steps of correcting a centerline point of a rib centerline.

At step 110, an image plane $\mathcal{P}$ of the medical image volume orthogonal to the rib centerline at the current centerline point is calculated. In particular, the image plane $\mathcal{P}$ is calculated to be normal to the tangent vector and intersect the rib centerline at the current centerline point. FIG. 2 illustrates exemplary results of various steps of correcting a centerline point of a rib centerline. As illustrated in FIG. 2, image 200 shows an image plane $\mathcal{P}$ 202 that is orthogonal to a rib centerline at a particular centerline point.

Returning to FIG. 1, at step 112, the image plane $\mathcal{P}$ is cropped to generate an image of interest u. The image plane $\mathcal{P}$ is cropped to form the image of interest u, such that the centerline point $c_p$ to be corrected is located at the center of the cropped image of interest u. The cropping can be performed by cropping a predetermined size box around the centerline point $c_p$. For example, in a possible implementation a crop box of size 31 mm may be used, but the present invention is not limited thereto. Referring to FIG. 2, image 210 shows the image of interest u generated from the image plane $\mathcal{P}$ 202. The centerline point $c_p$ 212 to be corrected is located at the center of the image of interest u 210.

Returning to FIG. 1, at step 114, the rib cross-section is segmented in the image of interest u. In an advantageous embodiment, the rib-cross section is segmented in the image of interest using a graph partitioning segmentation technique, such as graph cuts or random walker segmentation. In the embodiment described herein, random walker segmentation is used, but the present invention is not limited thereto and any other segmentation techniques can be used, such as level sets or Mumford-Shah segmentation. A graph $\mathcal{G} = \{\mathcal{V}, \epsilon\}$ includes a set of vertices $v \in \mathcal{V}$ and a set of edges $e \in \epsilon \subseteq \mathcal{V} \times \mathcal{V}$. An edge incident to vertices $v_i$ and $v_j$ is denoted by $e_{ij}$. A weighted graph is a graph in which every edge $e_{ij}$ is assigned a weight $w_{ij}$. In the present embodiment edge weights are employed to reflect energy terms. In this embodiment, each pixel $i=(x,y)$ is associated with a binary variable $x_i$ that represents a segmentation label corresponding to foreground (rib cross-section) or background. Every variable $x_i$ has a corresponding vertex $v_i$ in the graph $\mathcal{G}$.

The random walker segmentation problem is formulated as an energy minimization problem where the energy E is minimized over the image domain of the image of interest u subject to some boundary constraints. The energy E is given as:

$$E(x) = \sum_{p,q \in \mathcal{N}} w_{pq}(x_p - x_q)^2, \tag{1}$$

where $\mathcal{N}$ is the neighborhood of the pixel p, and the edge weights $w_{pq}$ reflect the strength of the boundary as expressed in terms of the image intensities as:

$$w_{pq} = \exp(-\beta(u(p) - u(q))^2), \tag{2}$$

where u(p) and u(q) are the image intensities at pixels p and q, respectively, and $\beta$ is a free parameter. In an exemplary implementation, β=0.01, but the present invention is not limited thereto. The boundary constraints can be expressed as:

$$x_p = \begin{cases} 1 & \text{if } v_p \in F \\ 0 & \text{if } v_p \in B \end{cases}, \quad (3)$$

where $F \subset \mathcal{V}$ is a set of foreground seeds that are guaranteed to be part of the object (i.e., the rib cross-section) and $B \subset \mathcal{V}$ is a set of background seeds that are guaranteed to be part of the background. Accordingly, foreground seeds ($x_p=1$) are generated inside the rib cross-section and background seeds ($x_p=0$) are generated outside of the rib. The foreground and background seeds are generated based on the current centerline point $c_p$.

Figure 3:
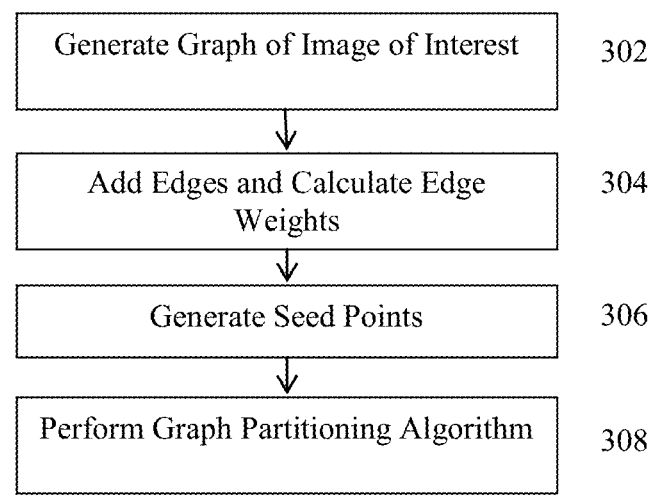
FIG. 3 illustrates a method of segmenting a rib cross-section in an image of interest according to an embodiment of the present invention.

FIG. 3 illustrates a method of segmenting a rib cross-section in an image of interest u according to an embodiment of the present invention. The method of FIG. 3 can be used to implement step 114 of FIG. 1. At step 302, a graph $\mathcal{G}$ is generated such that every pixel in the image of interest u has a corresponding vertex v in the graph G.

At step 304, edges are added to the graph $\mathcal{G}$ and edge weights are calculated. The edges of the graph $\mathcal{G}$ are added according to a neighborhood $\mathcal{N}$ of each pixel p, such that for each pixel p and each pixel q in the neighborhood $\mathcal{N}$ of p, an edge $e_{pq}$ is added with the weight $w_{pq}=\exp(-\beta(u(p)-u(q))^2)$, where β is a free parameter (e.g., β=0.01). In an exemplary implementation, an eight connected graph is used for the neighborhood $\mathcal{N}$, but the present invention is not limited thereto.

At step 306, the seed points are generated. The foreground and background seed points (boundary conditions) can be generated as follows: For foreground seeds, for each pixel p such that $\|p-c_p\|<d_f$ (e.g., $d_f=1.5$ mm), consider p to be a foreground seed. For background seeds, for each pixel p such that $\|p-c_p\|>d_b$ (e.g., $d_b=7$ mm), consider p to be a background seed. Accordingly, all pixels within a first distance ($d_f$) from the current centerline point are set as foreground seeds and pixels greater than a second distance ($d_b$) from the current centerline point are set as background seeds. Referring to FIG. 2, image 220 shows foreground seed points 222 and background seed points 224 generated for the image of interest 210.

Returning to FIG. 3, at step 308, the graph partitioning algorithm is performed to obtain a segmentation mask of the rib-cross section. For example, the random walker segmentation algorithm can be performed. In this case, the graph is partitioned to minimize the energy function expressed in Equation (1) subject to the boundary conditions corresponding to the foreground and background seeds. This results in a label of foreground or background being assigned to each vertex in the graph $\mathcal{G}$ and each corresponding pixel in the image of interest u. Referring to FIG. 2, image 230 shows a segmentation mask of the segmented rib cross-section 232 in the image of interest 210.

Returning to FIG. 1, at step 116, the center of mass of the segmented rib cross-section is calculated. The center of mass of the segmentation mask of the segmented rib cross-section can be calculated as $$c'_{p2D} = \frac{\sum_u i x_p}{\sum_u x_p}.$$

Recall that i=(x,y) represents the Cartesian coordinates of the point i in the plane $\mathcal{P}$.

At step 118, a corrected centerline point $c'_p$ is generated by mapping the location of the calculated center of mass $c'_{p2D}$ to a 3D location in the image volume. In particular, the 2D modified center point $c'_{p2D}$ in the plane $\mathcal{P}$ obtained by calculating the center of mass of the segmented rib cross-section is mapped to a 3D location in the medical image volume based on the location of the plane $\mathcal{P}$ in the 3D volume. This results in the 3D location of the corrected centerline point $c'_p$.

At step 120, it is determined if the centerline has converged. In one embodiment it is determined if the deviation between the original centerline and the corrected centerline is less than an error threshold. In particular, a distance error may be calculated between the current corrected point and the closest centerline point on the original rib centerline, and the distance error is compared to an error threshold. If the distance error is less than the error threshold, the centerline has converged. In an exemplary implementation, the error threshold may be set to be 2 mm, but the present invention is not limited thereto. In an alternative embodiment, the centerline may be determined to converge after a predetermined number of iterations (i.e., a predetermined number of centerline points are corrected). If it is determined that the centerline has not converged, the method proceeds to step 122. In this case, the centerline correction is extended to correct a next centerline point along the rib centerline. This extends the editing range beyond the initial user click point in order to correct a large portion of the rib with minimal user interaction. If it is determined that the centerline has not converged, the method proceeds to step 130.

At step 122, the tangent vector of the rib centerline is updated based on the corrected centerline point $c'_p$. The tangent vector is re-calculated as described in step 108, using the corrected centerline point $c'_p$ in place of $c_p$.

At step 124, a next centerline point is calculated. In particular, a new centerline point in the direction of the tangent vector is calculated. For example, the next centerline point may be a point in the 3D medical image volume that is a predetermined step size from the previous corrected centerline point in the direction of the tangent vector calculated at the corrected centerline point.

At step 126, it is determined if k centerline points have been corrected. In an exemplary implementation, k=10, but the present invention is not limited thereto. If it is determined that k centerline points have not been corrected, the method returns to step 108 and steps 108-120 are repeated for the next centerline point in order to correct the next centerline point. If it is determined that k updates have been corrected, the method proceeds to step 128 and the centerline point is re-initialized. It is to be understood the re-initialization is performed after every k centerline point corrections. Accordingly, a counter that tracks the number of iterations can be reset once k iterations have been counted, or the total number of iterations can be tracked and the re-initialization can be triggered after every multiple of k iterations.

At step 128, the centerline point is re-initialized. In order to prevent the centerline from deviating from the correct solution, the centerline point is reinitialized by calculating a new point based on the neighboring ribs. The re-initialized point is calculated as an average point of the neighboring rib centerlines. In particular, a point p is re-initialized as $$p = \frac{p_{above} + p_{below}}{2},$$

where $p_{above}$ and $p_{below}$ are the closest centerline points to p calculated from the rib above and below the current rib being corrected, respectively. This re-initialization is effective because it is unlikely that 3 consecutive ribs from the original extracted rib centerlines need correction in the same location. Accordingly, this re-initialization improves the initial centerline point where the tracing operation is restarted. In a scenario in which, there are three consecutive rib centerlines that are poorly extracted at the same locations, the tracing may stop and the user may provide an additional click point for further editing. After the centerline point is reinitialized, the method proceeds to step 108 and steps 108-120 are repeated for the re-initialized centerline point in order to obtain a corrected centerline point for the re-initialized centerline point.

At step 130, once the rib centerline has converged, the corrected rib centerline is output. For the example, the corrected rib centerline can be output by displaying a 3D visualization of the rib centerlines including the corrected rib centerline, displaying cross-section images of the corrected rib centerline, and/or generating and displaying a 2D unfolded rib image including the corrected rib centerline. The unfolded rib image may be generated using the rib unfolding method described in U.S. Published Patent Application No. 2013/0070996, which is incorporated herein by reference in its entirety. The method of FIG. 1 may be repeated to correct multiple rib centerlines based on a respective user input for each centerline.

In the method of FIG. 1, each centerline point is corrected based on a segmented rib cross-section in a 2D image plane that is orthogonal to the rib centerline at the centerline point. In an alternate embodiment, a 3D volume of interest surrounding the rib centerline can be cropped in the medical image volume and the rib can be segmented in the 3D volume of interest.

Figure 4:
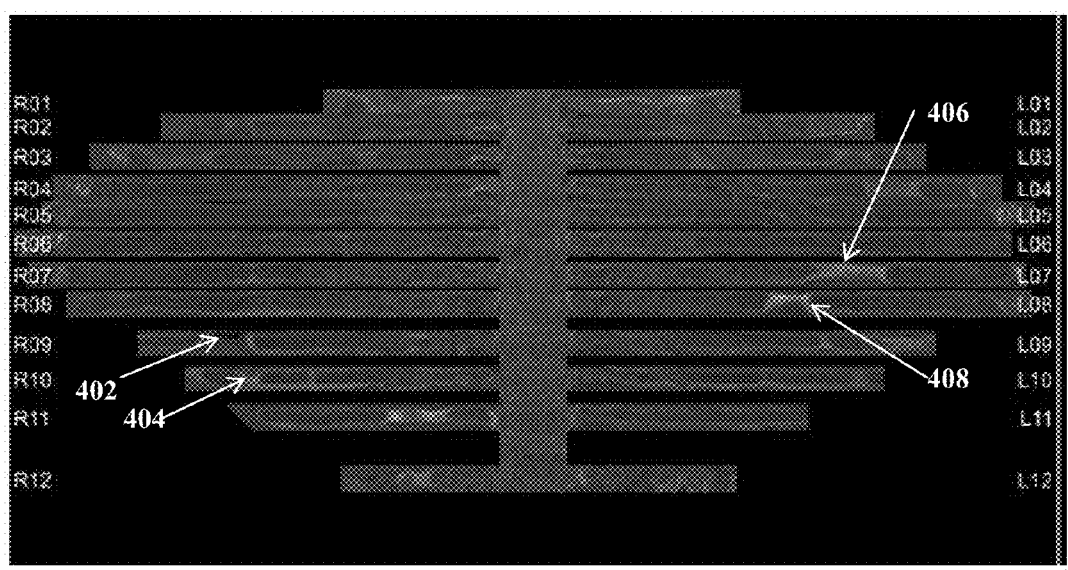
FIG. 4 illustrates an unfolded rib image resulting from automatic rib centerline extraction.
Figure 5:
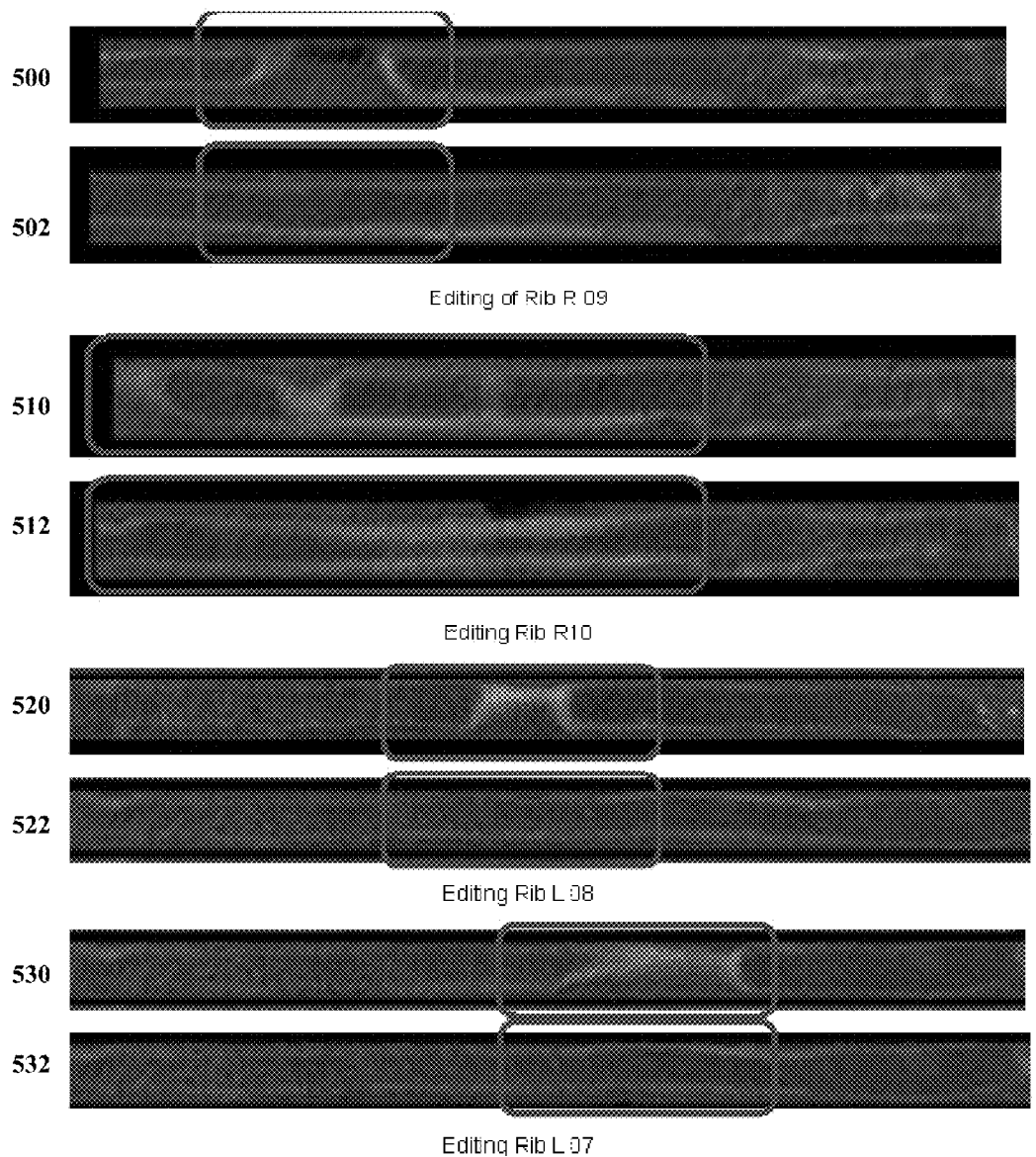
FIG. 5 illustrates exemplary results of correcting the rib centerlines of FIG. 4.

FIGS. 4 and 5 illustrate exemplary centerline editing results using the method of FIG. 1. FIG. 4 illustrates an unfolded rib image resulting from automatic rib centerline extraction. As shown in FIG. 4, some of the rib centerlines are not extracted properly. In particular, FIG. 4 shows inaccuracies 402, 404, 406, and 408 in ribs R09, R10, L07, and L08, respectively. FIG. 5 illustrates exemplary results of correcting the rib centerlines of FIG. 4. As shown in FIG. 5, images 500 and 502 show the centerline of rib R09 before and after correction, respectively. Images 510 and 512 show the centerline of rib R10 before and after correction, respectively. Images 520 and 522 show the centerline of rib L08 before and after correction, respectively. Images 530 and 532 show the centerline of rib L07 before and after correction, respectively. The boxes in the images of FIG. 5 highlight a region of interest that was edited for each respective rib centerline.

Figure 6:
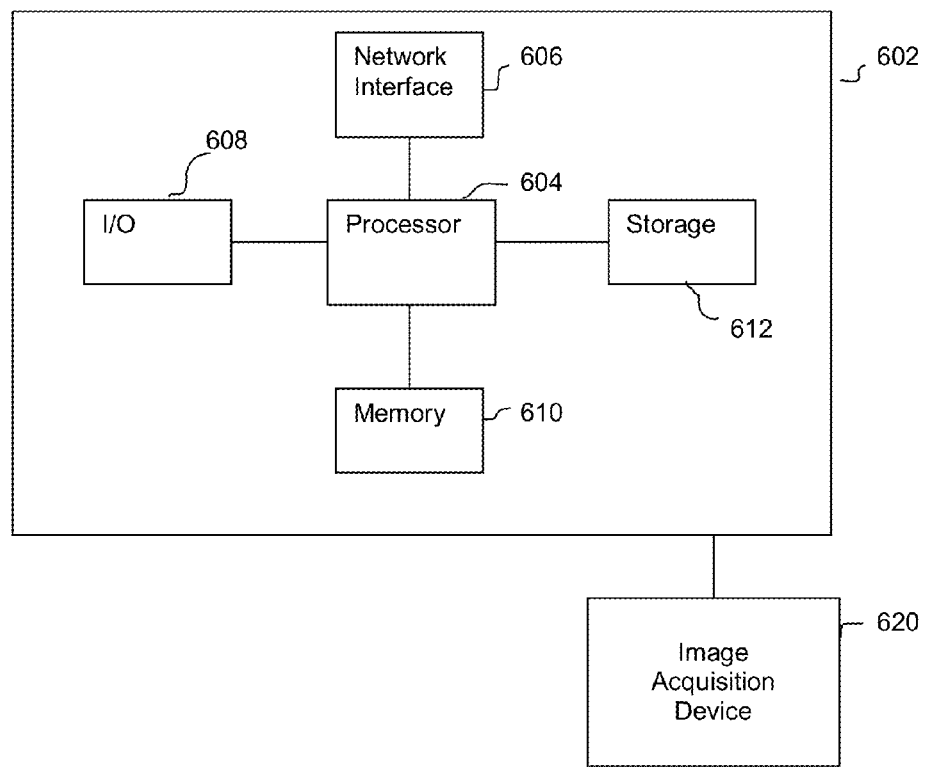
FIG. 6 is a high-level block diagram of a computer capable of implementing the present invention.

The above-described method for data driven editing of rib centerlines extracted from medical image data may be implemented on a computer using well-known computer processors, memory units, storage devices, computer software, and other components. A high-level block diagram of such a computer is illustrated in FIG. 6. Computer 602 contains a processor 604, which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the steps of the methods of FIGS. 1 and 3 may be defined by the computer program instructions stored in the memory 610 and/or storage 612 and controlled by the processor 604 executing the computer program instructions. An image acquisition device 620, such as a CT scanning device, can be connected to the computer 602 to input image data to the computer 602. It is possible to implement the image acquisition device 620 and the computer 602 as one device. It is also possible that the image acquisition device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). Such input/output devices 608 may be used in conjunction with a set of computer programs as an annotation tool to annotate volumes received from the image acquisition device 620. One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for correcting a rib centerline extracted from a medical image volume, comprising:
receiving a user input location indicating an inaccuracy in a rib centerline extracted from a medical image volume;
determining a centerline point to be corrected corresponding to the user input location by:
performing a local correction of the rib centerline in a vicinity of the user input location, resulting in a locally edited centerline, and
determining a centerline point closest to the user input location on the locally edited centerline to be the centerline point to be corrected;
segmenting a portion of the rib surrounding the centerline point to be corrected based on image data in the medical image volume; and
generating a corrected centerline point for the centerline point to be corrected based on the segmented portion of the rib.

2. The method of claim 1, wherein performing a local correction of the rib centerline in a vicinity of the user input location, resulting in a locally edited centerline comprises:
performing a local geometric correction of the rib centerline in a vicinity of the user input location by applying cubic spline interpolation to the rib centerline in the vicinity of the user input location.

3. The method of claim 1, wherein segmenting a portion of the rib surrounding the centerline point to be corrected based on image data in the medical image volume comprises:
   calculating a tangent vector of the rib centerline at the centerline point to be corrected;
   calculating an image plane in the medical image volume that is orthogonal to the rib centerline at the centerline point to be corrected based on the tangent vector at the centerline point to be corrected; and
   segmenting a rib cross-section in the image plane.

4. The method of claim 3, wherein segmenting a rib cross-section in the image plane comprises:
   cropping the image plane to generate an image of interest around the current centerline point to be corrected; and
   segmenting the rib cross-section in the image of interest.

5. The method of claim 4, wherein segmenting the rib cross-section in the image of interest comprises:
   generating a graph in which each of a plurality of pixels in the image of interest has a corresponding vertex and edges connect vertices corresponding to pixels within a neighborhood of each other;
   calculating edge weights for edges connecting vertices based on intensity values of the corresponding pixels in the image of interest;
   generating foreground and background seed points based on the current centerline point to be corrected; and
   segmenting the rib-cross section based on the edge weights and the foreground and background seed points using a graph partitioning algorithm.

6. The method of claim 5, wherein generating foreground and background seed points based on the current centerline point to be corrected comprises:
   assigning pixels in the image of interest within a first distance of the current centerline point to be corrected to be the foreground seeds; and
   assigning pixels in the image of interest farther than a second distance from the current centerline point to be corrected to be the background seeds.

7. The method of claim 5, wherein segmenting the rib-cross section based on the edge weights and the foreground and background seed points using a graph partitioning algorithm comprises:
   segmenting the rib-cross section based on the edge weights and the foreground and background seed points using random walker segmentation.

8. The method of claim 3, wherein generating a corrected centerline point for the centerline point to be corrected based on the segmented portion of the rib comprises:
   calculating a center of mass of the segmented rib-cross section in the image plane; and
   generating the corrected centerline point by mapping the calculated center of mass to a 3D location in the medical image volume.

9. The method of claim 1, wherein segmenting a portion of the rib surrounding the centerline point to be corrected based on image data in the medical image volume comprises:
   cropping a 3D volume of interest surrounding the centerline point to be corrected in the medical image volume; and
   segmenting a portion of the rib in the 3D volume of interest.

10. The method of claim 9, wherein generating a corrected centerline point for the centerline point to be corrected based on the segmented portion of the rib comprises:
    calculating a center of mass of the segmented portion of the rib in the 3D volume of interest.

11. The method of claim 1, further comprising:
    calculating a tangent vector of the rib centerline at the corrected centerline point;
    calculating a next centerline point based on the calculated tangent vector of the rib centerline at the corrected centerline point; and
    repeating the segmenting a portion of the rib and generating a corrected centerline point for the next centerline point.

12. The method of claim 11, further comprising:
    re-initializing the next centerline point based on centerline points of rib centerlines of neighboring ribs prior to repeating the segmenting a portion of the rib and generating a corrected centerline point for the next centerline point.

13. The method of claim 12, wherein re-initializing the next centerline point based on centerline points of rib centerlines of neighboring ribs comprises:
    calculating a re-initialized point as an average of centerline points nearest to the next centerline point on rib centerlines of ribs above and below the rib centerline being corrected.

14. The method of claim 1, further comprising:
    repeating the segmenting a portion of the rib and generating a corrected centerline point for a plurality of iterations, wherein at each iteration a respective next centerline point of the rib centerline is corrected.

15. The method of claim 14, further comprising:
    after every k iterations, re-initializing the respective next centerline point based on centerline points of rib centerlines of neighboring ribs.

16. The method of claim 14, wherein repeating the segmenting a portion of the rib and generating a corrected centerline point for a plurality of iterations, wherein at each iteration a respective next centerline point of the rib centerline is corrected comprises:
    repeating the segmenting a portion of the rib and generating a corrected centerline point for a plurality of centerline points until a corrected rib centerline converges.

17. The method of claim 1, further comprising:
    generating an unfolded rib image using a corrected rib centerline including the corrected centerline point.

18. An apparatus for correcting a rib centerline extracted from a medical image volume, comprising:
    means for receiving a user input location indicating an inaccuracy in a rib centerline extracted from a medical image volume;
    means for determining a centerline point to be corrected corresponding to the user input location, comprising:
        means for performing a local correction of the rib centerline in a vicinity of the user input location, resulting in a locally edited centerline, and
        means for determining a centerline point closest to the user input location on the locally edited centerline to be the centerline point to be corrected;
    means for segmenting a portion of the rib surrounding the centerline point to be corrected based on image data in the medical image volume; and
    means for generating a corrected centerline point for the centerline point to be corrected based on the segmented portion of the rib.

19. The apparatus of claim 18, wherein the means for segmenting a portion of the rib surrounding the centerline point to be corrected based on image data in the medical image volume comprises:
  means for calculating a tangent vector of the rib centerline at the centerline point to be corrected;
  means for calculating an image plane in the medical image volume that is orthogonal to the rib centerline at the centerline point to be corrected based on the tangent vector at the centerline point to be corrected; and
  means for segmenting a rib cross-section in the image plane.

20. The apparatus of claim 19, wherein the means for segmenting a rib cross-section in the image plane comprises:
  means for cropping the image plane to generate an image of interest around the current centerline point to be corrected; and
  means for segmenting the rib cross-section in the image of interest.

21. The apparatus of claim 20, wherein the means for segmenting the rib cross-section in the image of interest comprises:
  means for generating a graph in which each of a plurality of pixels in the image of interest has a corresponding vertex and edges connect vertices corresponding to pixels within a neighborhood of each other;
  means for calculating edge weights for edges connecting vertices based on intensity values of the corresponding pixels in the image of interest;
  means for generating foreground and background seed points based on the current centerline point to be corrected; and
  means for segmenting the rib-cross section based on the edge weights and the foreground and background seed points using a graph partitioning algorithm.

22. The apparatus of claim 19, wherein the means for generating a corrected centerline point for the centerline point to be corrected based on the segmented portion of the rib comprises:
  means for calculating a center of mass of the segmented rib-cross section in the image plane; and
  means for generating the corrected centerline point by mapping the calculated center of mass to a 3D location in the medical image volume.

23. The apparatus of claim 18, wherein the means for segmenting a portion of the rib surrounding the centerline point to be corrected based on image data in the medical image volume comprises:
  means for cropping a 3D volume of interest surrounding the centerline point to be corrected in the medical image volume; and
  means for segmenting a portion of the rib in the 3D volume of interest.

24. The apparatus of claim 23, wherein the means for generating a corrected centerline point for the centerline point to be corrected based on the segmented portion of the rib comprises:
  means for calculating a center of mass of the segmented portion of the rib in the 3D volume of interest.

25. The apparatus of claim 18, further comprising:
  means for calculating a tangent vector of the rib centerline at the corrected centerline point;
  means for calculating a next centerline point based on the calculated tangent vector of the rib centerline at the corrected centerline point; and
  means for repeating the segmenting a portion of the rib and generating a corrected centerline point for the next centerline point.

26. The apparatus of claim 25, further comprising:
  means for re-initializing the next centerline point based on centerline points of rib centerlines of neighboring ribs prior to repeating the segmenting a portion of the rib and generating a corrected centerline point for the next centerline point.

27. A non-transitory computer readable medium storing computer program instructions for correcting a rib centerline extracted from a medical image volume, the computer program instructions when executed by a processor cause the processor to perform operations comprising:
  receiving a user input location indicating an inaccuracy in a rib centerline extracted from a medical image volume;
  determining a centerline point to be corrected corresponding to the user input location by:
    performing a local correction of the rib centerline in a vicinity of the user input location, resulting in a locally edited centerline, and
    determining a centerline point closest to the user input location on the locally edited centerline to be the centerline point to be corrected;
  segmenting a portion of the rib surrounding the centerline point to be corrected based on image data in the medical image volume; and
  generating a corrected centerline point for the centerline point to be corrected based on the segmented portion of the rib.

28. The non-transitory computer readable medium of claim 27, wherein segmenting a portion of the rib surrounding the centerline point to be corrected based on image data in the medical image volume comprises:
  calculating a tangent vector of the rib centerline at the centerline point to be corrected;
  calculating an image plane in the medical image volume that is orthogonal to the rib centerline at the centerline point to be corrected based on the tangent vector at the centerline point to be corrected;
  segmenting a rib cross-section in the image plane.

29. The non-transitory computer readable medium of claim 28, wherein segmenting a rib cross-section in the image plane comprises:
  cropping the image plane to generate an image of interest around the current centerline point to be corrected; and
  segmenting the rib cross-section in the image of interest.

30. The non-transitory computer readable medium of claim 29, wherein segmenting the rib cross-section in the image of interest comprises:
  generating a graph in which each of a plurality of pixels in the image of interest has a corresponding vertex and edges connect vertices corresponding to pixels within a neighborhood of each other;
  calculating edge weights for edges connecting vertices based on intensity values of the corresponding pixels in the image of interest;
  generating foreground and background seed points based on the current centerline point to be corrected; and
  segmenting the rib-cross section based on the edge weights and the foreground and background seed points using a graph partitioning algorithm.

31. The non-transitory computer readable medium of claim 30, wherein generating a corrected centerline point for the centerline point to be corrected based on the segmented portion of the rib comprises:

calculating a center of mass of the segmented rib-cross section in the image plane; and generating the corrected centerline point by mapping the calculated center of mass to a 3D location in the medical image volume.

32. The non-transitory computer readable medium of claim 27, wherein segmenting a portion of the rib surrounding the centerline point to be corrected based on image data in the medical image volume comprises:

cropping a 3D volume of interest surrounding the centerline point to be corrected in the medical image volume; and segmenting a portion of the rib in the 3D volume of interest.

33. The non-transitory computer readable medium of claim 32, wherein generating a corrected centerline point for the centerline point to be corrected based on the segmented portion of the rib comprises:

calculating a center of mass of the segmented portion of the rib in the 3D volume of interest.

34. The non-transitory computer readable medium of claim 27, wherein the operations further comprise:

calculating a tangent vector of the rib centerline at the corrected centerline point;

calculating a next centerline point based on the calculated tangent vector of the rib centerline at the corrected centerline point; and repeating the segmenting a portion of the rib and generating a corrected centerline point for the next centerline point.

35. The non-transitory computer readable medium of claim 34, wherein the operations further comprise:

re-initializing the next centerline point based on centerline points of rib centerlines of neighboring ribs prior to repeating the segmenting a portion of the rib and generating a corrected centerline point for the next centerline point.

36. The non-transitory computer readable medium of claim 27, wherein the operations further comprise:

repeating the segmenting a portion of the rib and generating a corrected centerline point for a plurality of iterations, wherein at each iteration a respective next centerline point of the rib centerline is corrected.

37. The non-transitory computer readable medium of claim 36, wherein the operations further comprise:

after every k iterations, re-initializing the respective next centerline point based on centerline points of rib centerlines of neighboring ribs.

38. The non-transitory computer readable medium of claim 36, wherein repeating the segmenting a portion of the rib and generating a corrected centerline point for a plurality of iterations, wherein at each iteration a respective next centerline point of the rib centerline is corrected comprises:

repeating the segmenting a portion of the rib and generating a corrected centerline point for a plurality of centerline points until a corrected rib centerline converges.

* * * * *